United States Patent

Minichshofer et al.

[11] Patent Number: 4,962,576
[45] Date of Patent: Oct. 16, 1990

[54] PROCESS AND APPARATUS FOR NEEDLING A NON-WOVEN STRIP TO A REVOLVING ENDLESS CARRIER WEB

[75] Inventors: Klaus Minichshofer, Linz; Peter Müller, Marchtrenk; Hannes Pum, Wels, all of Austria

[73] Assignee: Textilmaschinenfabrik Dr. Ernst Fehrer Aktiengesellschaft, Leonding, Austria

[21] Appl. No.: 438,536

[22] Filed: Nov. 16, 1989

[30] Foreign Application Priority Data

Nov. 22, 1988 [AT] Austria ................................. 2859/88

[51] Int. Cl.⁵ ............................................. D04H 18/00
[52] U.S. Cl. ...................................................... 28/110
[58] Field of Search ................................. 28/107, 110

[56] References Cited

U.S. PATENT DOCUMENTS 4,614,969 9/1986 Gerundt et al. ................... 28/110 X

FOREIGN PATENT DOCUMENTS 0123969 4/1984 European Pat. Off. .
3619070 1/1987 Fed. Rep. of Germany ........ 28/110

Primary Examiner—Werner H. Schroeder
Assistant Examiner—Bradley Kurtz DeSandro
Attorney, Agent, or Firm—Kurt Kelman

[57] ABSTRACT

In a process in which a non-woven strip is needled to a revolving endless carrier web, adjacent convolutions of the non-woven strip should exactly adjoin each other. For that purpose each convolution of the non-woven strip is initially needled to the carrier web with the exception of a marginal portion, which constitutes a free longitudinal edge, and that marginal portion is needled after the position and direction of the free longitudinal edge have been detected.

17 Claims, 4 Drawing Sheets

PROCESS AND APPARATUS FOR NEEDLING A NON-WOVEN STRIP TO A REVOLVING ENDLESS CARRIER WEB

BACKGROUND OF THE INVENTION

1. Field of the Invention

This invention relates to a process of needling a non-woven strip to a revolving endless carrier web, wherein the non-woven strip is fed at a predetermined lead angle and is applied to the carrier web to form a plurality of convolutions at least in one ply and is continually needled to the carrier web and the position and longitudinal direction of the convolution which has been needled to the carrier web during the preceding revolution thereof is utilized for a control of the traversing movement of the non-woven strip as it is applied to the carrier web in dependence on the desired lead angle. The invention relates also to an apparatus for carrying out the process.

2. Description of the Prior Art

When it is desired to apply to a usually endless revolving endless carrier web a non-woven strip in such a manner that the non-woven strip, which is fed to the carrier web by a suitable feeder, can be laid on the carrier web in the longitudinal direction of that last preceding convolution of the non-woven strip on the carrier web, it will be necessary to detect the position and longitudinal direction of that convolution of the non-woven strip which has been applied to the carrier web during its last preceding revolution so that the feeder for the non-woven strip can be moved to a corresponding extent transversely to the direction of travel and longitudinal direction of the carrier web. Because the step formed in the surface of the carrier web by the needled-on non-woven strip is small owing to the small thickness of the needled-on non-woven web and because the non-woven strip has only a low-strength, excessive errors would be involved in a mechanical or non-contacting scanning of the free longitudinal edge of that last preceding convolution of the non-woven strip on the carrier web. For this reason it has already been proposed (EP-A-123 969) to provide an optoelectronic monitoring device including a line-scanning camera for detecting a marking thread which is applied to the carrier web concurrently with the non-woven strip and has a suitable contrasting color. The position of that marking thread can readily be detected by the line-scanning camera and can be used for a control of the traversing movement of the feeder for the non-woven strip relative to the carrier web.

But that known process has the disadvantage that the position and longitudinal direction of the non-woven strip can be detected only by a detection of the marking thread which has been applied to the carrier web concurrently with the non-woven strip whereas it is not possible to detect the position and direction of the free longitudinal edge of the last preceding convolution formed by the non-woven strip so that variations of the width of the non-woven strip cannot be taken into account. As a result, an application of the several convolutions of the non-woven strip with closely adjoining edges or with a predetermined, constant overlap can be accomplished only with great difficulty in practice. Besides, any irregularities of the laying of the marking thread will be reflected by the control so that the application of the marking thread may constitute a cause of additional errors in the exact laying of the several convolutions of the non-woven strip. Finally, the application of a marking thread which is concurrent with the non-woven strip to the carrier web involves a higher expenditure because such marking thread must usually be removed from the carrier web before a new convolution of the non-woven strip is applied to the carrier web.

SUMMARY OF THE INVENTION

For this reason it is an object of the invention to avoid said disadvantages and so to improve a process which is of the kind described first hereinbefore with simple means that it is possible to detect not only the longitudinal direction of the last preceding convolution of the non-woven strip on the carrier web but to detect also a variation of the width of the non-woven strip as the non-woven strip for forming a new convolution is applied.

The object set forth is accomplishe in accordance with the invention in that each convolution of the non-woven strip is initially needled onto the carrier web with the exception of a marginal strip which constitutes a leading free longitudinal edge of the non-woven strip in the direction of the traversing movement, and the position and direction of said free longitudinal edge of the non-needled marginal strip are detected during the next succeeding revolution of the carrier web before that marginal strip is needled to the carrier web.

Because the position and direction of the free longitudinal edge of that convolution of the non-woven strip which has been needled to the carrier web during its preceding revolution are detected, the non-woven strip as it is applied to the carrier web can be caused to exactly adjoin the last preceding convolution of the non-woven strip without a marking of the position and longitudinal direction of the non-woven strip and for a determination of the width of the strip because any width variation of the non-woven strip will necessarily be taken into account in the detection of the position and direction of that free longitudinal edge. For a reliable and exact detection of the position and longitudinal direction of the free longitudinal edge of each of the convolutions of the non-woven strip which are consecutively applied to the carrier web it will be necessary, however, that the non-woven strip has an adequate thickness at its free longitudinal edge. For this reason the non-woven strip which has been applied to the carrier web is initially needled to the latter with the exception of a marginal portion, which constitutes the free longitudinal edge. In that case the thickness of the non-needled non-woven strip rather than only the thickness of the needled non-woven strip will be available for the detection of that longitudinal edge and the position of said free longitudinal edge can exactly be detected because it forms a relatively large step on the surface of the carrier web. Whereas the presence of the initially non-needled marginal portion of the non-woven strip is desirable for ensuring that the next succeeding convolution that is formed will closely adjoin the last preceding convolution, the provision of such marginal portion will not adversely affect the product because that marginal strip is also needled onto the carrier web when the position and direction of the free longitudinal edge have been detected. The needling of that marginal portion is desirably effected together with the initial needling of the next succeeding convolution to the carrier web. As a result, the carrier web will also be provided with a uniformly needled-on nonwoven layer consisting of a plurality of individual convolutions. Adjacent convolutions of the non-woven strip may have closely adjoining edges or may overlap each other in a predetermined width to form a plurality of layers.

An apparatus for carrying out that process may comprise deflecting means for deflecting the endless carrier web, a feeder for the non-woven strip, which feeder is movable transversely to the carrier web, a needling device, which moves in unison with the feeder relative to the carrier web and has a working width that is equal to the width of the non-woven strip, which needling device serves to needle the non-woven web to the carrier web, and means for detecting the position and longitudinal direction of that convolution of the non-woven strip which has been needled to the carrier web during its last preceding revolution. In such an apparatus it should be ensured that a marginal portion of that portion of the non-woven strip which is being needled will not be needled adjacent to the free longitudinal edge of the non-woven strip. This is accomplished in that the needling device is offset from the feeder opposite to the direction of the traversing movement of the feeder relative to the carrier web to an extent which corresponds to the width of a marginal portion of the non-woven strip and the means for detecting the position and longitudinal direction of that convolution of the non-woven strip which has been needled to the carrier web during its last preceding revolution are arranged adjacent to said free longitudinal edge and in front of the needling device when viewed in the direction in which the carrier web revolves. Because the needling device is offset from the feeder to an extent corresponding to the width of the marginal portion of the non-woven strip, the area which is needled will be correspondingly offset in a simple manner from the non-woven strip which is being fed so that said non-woven strip will initially be needled to the carrier web with the exception of a marginal portion. Because the working width of the needling device equals the width of the non-woven strip the non-needled marginal portion will be needled to the carrier web together with the non-woven strip which constitutes the next succeeding convolution after one convolution of the non-woven strip has been completed. For this reason the means for scanning the free longitudinal edge of the marginal strip must precede the needling device when viewed in the direction in which the carrier web revolves so that said means can detect the longitudinal edge at the non-needled marginal portion. When a layer of the non-woven strip has been applied to the carrier web and a further layer consisting of a plurality of oppositely handed convolutions of the non-woven strip is subsequently applied, so that the feeder will be moved in the opposite direction, it will be necessary also to offset the needling device relative to the feeder in the opposite direction.

Various means may be provided for a non-contacting scanning of the free longitudinal edge at the non-needled marginal portion and a mechanical feeder may be used under certain circumstances. But a desirable scanning will usually be permitted if the means for scanning the edge to be adjoined consists of a scanning sensor, which comprises a light-emitting and light-receiving unit, which is adapted to generate an edge-detecting light beam and to be driven to reciprocate transversely to the free longitudinal edge so as to move the light beam within a width range which contains said free longitudinal edge. A light beam which is reciprocable across the free longitudinal edge of the convolution of the non-woven strip which has been applied to the carrier web may be used for a generation of signals which in association with the instantaneous position of the scanning sensor permit a detection of the position and longitudinal direction of the edge of that convolution because the position assumed by the scanning sensor at the time of the occurrence of the control signal that is generated by the receiving unit of the scanning sensor when the light beam is incident on the longitudinal edge will reflect the instantaneous position of that longitudinal edge and several detected positions of the longitudinal edge of the convolution of the non-woven strip can be used to determine the position and longitudinal direction of that longitudinal edge, e.g., by means of a computer. The low strength of the non-woven strip and the low optical contrast between the non-woven strip and the carrier web will not adversely affect the detection of the free longitudinal edge because the control signal will be generated in response to the surface step formed between the non-woven strip and the carrier web at the longitudinal edge and that surface step is sufficiently large because the marginal portion is not needled.

Such a scanning device having a desirable design will be obtained if the scanning sensor consists of at least one photodetector, which is arranged adjacent to a deflecting member for deflecting the carrier web and said photodetector produces an edge-detecting light beam which extends in a direction which is tangential to the deflecting member, and which beam is spaced from the carrier web a distance which is smaller than the thickness of the non-needled non-woven strip. If such photodetector is moved in the axial direction of the deflecting member across the free longitudinal edge of the convolution of the non-woven strip, the light beam can be interrupted or released by the non-needled marginal portion of the non-woven strip and the position and direction of the free longitudinal edge of the convolution of the non-woven strip will be determined by the positions assumed by the sensor at the times at which the scanning sensor is switched in response to the interruption and release of the light beam. In that case it will be sufficient to ensure that the light beam will move in the range of the thickness of the non-needled marginal portion. This will be ensured if the light beam extends in a direction to which is tangential to the deflecting member, i.e., substantially parallel to the longitudinal edge, and the light beam is spaced from the carrier web a distance which is smaller than the thickness of the non-needed marginal portion. If the non-woven strip is applied to the carrier web in a plurality of layers in at least two working steps, any layer which has previously been applied to the carrier web will have to be regarded as a part of the carrier web.

If thickness variations of the carrier web must be expected, it will be recommendable to control the distance of the light beam from the deflecting member in dependence on the thickness of the carrier web so that the light beam will not be interrupted by a relatively thick portion of the carrier web and adjacent to a relatively thin portion of the carrier web the light beam will not be disposed above the surface of the non-needled marginal portion of the non-woven strip which has been applied.

Because that it is generally not easy to detect the thickness of the moving carrier web and the thickness need not exactly be detected, the thickness of the carrier web may be detected adjacent to the deflecting member by two photodetectors, which are disposed on that side of the edge-detecting light beam that is opposite to the non-woven strip and generate two thickness-detecting light beams, which extend in a direction which is tangential to the deflecting member and are radially spaced apart with respect to the deflecting member by a distance which is smaller than the thickness of the non-needled non-woven strip. If the thickness is monitored in that manner and the thickness-detecting light beam which is nearer to the deflecting member is interrupted by the carrier web whereas the other thickness-detecting light beam remains uninterrupted, it will be ensured that the edge-detecting light beam will be disposed in the thickness range of the non-woven strip, i.e., of the non-needled marginal portion which is to be scanned at its longitudinal edge. A release of the thickness-detecting light beam which is closer to the deflecting member or an interruption of the remote thickness-detecting light beam will then indicate that the distance from the scanning sensor to the deflecting member must be correspondingly re-adjusted.

The position and longitudinal direction of a non-needled marginal strip of a convolution of the non-woven strip which has been applied to the carrier web can alternately be detected by means of a light-emitting and light-receiving unit by which the deflection of a reflected light beam is detected which is moved across the free longitudinal edge of the convolution of the non-woven strip. For that purpose the scanning sensor may comprise at least one receiver for detecting the deflection of the light beam which has been reflected by the surface of the carrier web or by the surface of the non-woven strip which has been applied so that the deflection of the properly moved light beam will suddenly change adjacent to the free longitudinal edge of the non-needled marginal portion and control signals may be derived from such sudden change and in dependence on the instantaneous position of the scanning sensor will permit a determination of the position and longitudinal direction of the longitudinal edge of the convolution independently of the optical contrast between the carrier web and the non-woven strip which has been applied.

The surface step formed by the non-needled marginal portion between the surface of the carrier web and the previously applied convolution of the non-woven strip is much larger than the surface step which would be formed by the needled non-woven strip so that the free longitudinal edge of said strip can also be detected by an optoelectronic monitoring device comprising a line-scanning camera, provided that suitable means for a differential illumination of the free longitudinal edge are associated with the line-scanning camera. Owing to the large thickness of the non-needled marginal strip which constitutes the free longitudinal edge, the face of said edge can be differentially illuminated to ensure that the contrast between the edge face, on the one hand, and the carrier web and the surface of the non-woven strip, on the other hand, will be sufficient for a detection of the position and longitudinal direction of the longitudinal edge by a line-scanning camera. That contrast will either be due to the deep shadow which will be thrown by the edge face on the carrier web if the illumination is effected from that side on which the carrier web has previously been provided with convolutions of the non-woven strip, or will be due to the brightness difference which will result from an illumination by a light projector which is disposed on that side on which the carrier web has not yet been provided with convolutions of the non-woven strip, if the light emitted by said light projector is directed transversely to the edge face and substantially parallel to the surface of the carrier web. In the latter case, grazing light will be incident on the surfaces of the carrier web and of the convolutions of the non-woven strip and the edge face of the longitudinal edge will be substantially transverse to the incident light rays from the light projector so that said edge face will be seen by the line-scanning camera as a brightly illuminated line which can exactly be detected by the line-scanning camera and the signals generated by the line-scanning camera in dependence on the position of the detected longitudinal edge can, preferably after having been averaged, also be used to control the traversing movement of the feeder for the non-woven strip.

DETAILED DESCRIPTION OF THE PREFERRED EMBODIMENTS

Figure 1:
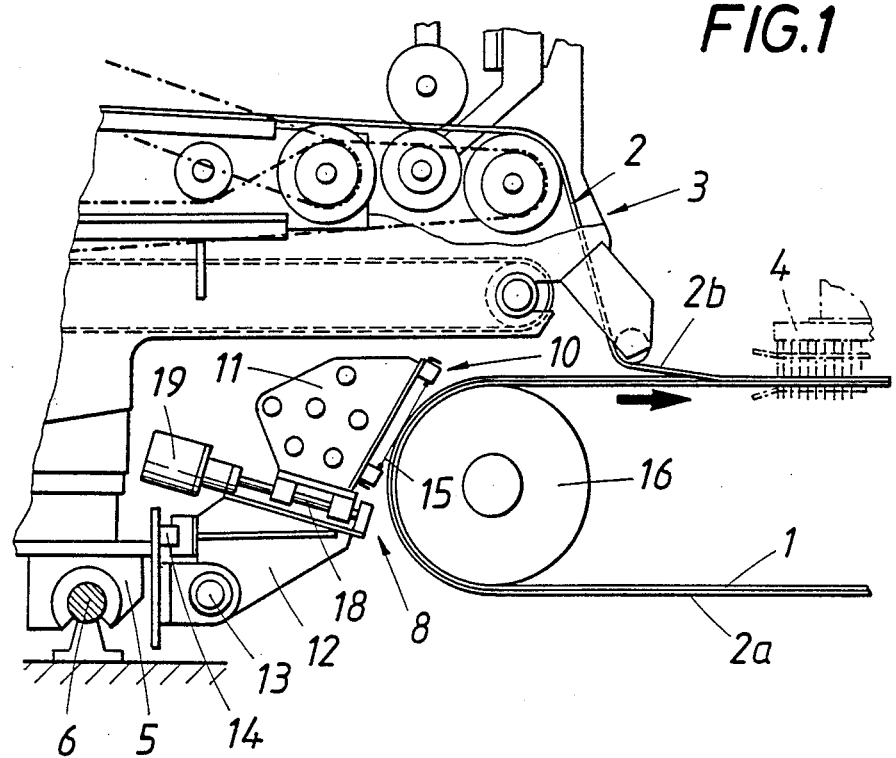
FIG. 1 is a simplified side elevation showing an apparatus in accordance with the invention for applying a non-woven strip to a revolving carrier web.

The process and apparatus in accordance with the invention will be described more in detail hereinafter with reference to the drawing.

In accordance with FIG. 1 a non-woven strip 2 is fed by a feeder 3 to a revolving endless carrier web 1 at a predetermined lead angle so that at least one layer consisting of a plurality of juxtaposed convolutions of the non-woven strip is formed on the carrier web 1, as is required, e.g., in the manufacture of paper machine felts. The non-woven strip 2 is fed to the carrier web 1 by the feeder 3 and revolves with the carrier web 1 and after said strip 2 has been applied to the carrier web 1 is fixed to the latter by means of a needling device 4, which has a working width that is equal to the width of the non-woven strip.

To ensure that the non-woven strip 2 will be applied to the carrier web 1 at a predetermined lead angle the feeder must be reciprocated across the carrier web 1. For that purpose the feeder 3 is mounted on a carriage 5, which is slidable on rods 6 and is adapted to be driven by means of a drive which is not shown. The feeder 3 is pivotally movable relative to the carriage 5 about a vertical axis of rotation so that the feeder can be adjusted to the desired lead angle.

The needling device 4, which has a working width that is equal to the width of the non-woven strip, must obviously be moved in unison with the feeder 3. This can be ensured in that the associated drives are coupled or are synchronized.

Figure 2:
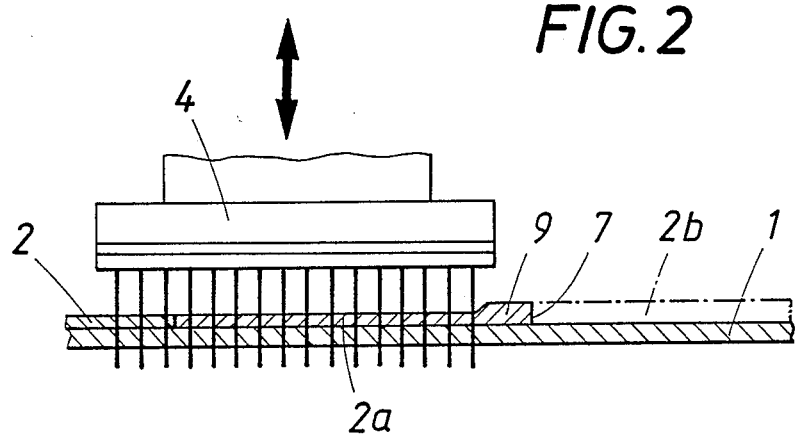
FIG. 2 is an enlarged sectional view on a plane that is transverse to the carrier web and shows the position of the needling device for needling the non-woven strip to the carrier web relative to the non-woven strip as it is fed to the carrier web.
Figure 3:
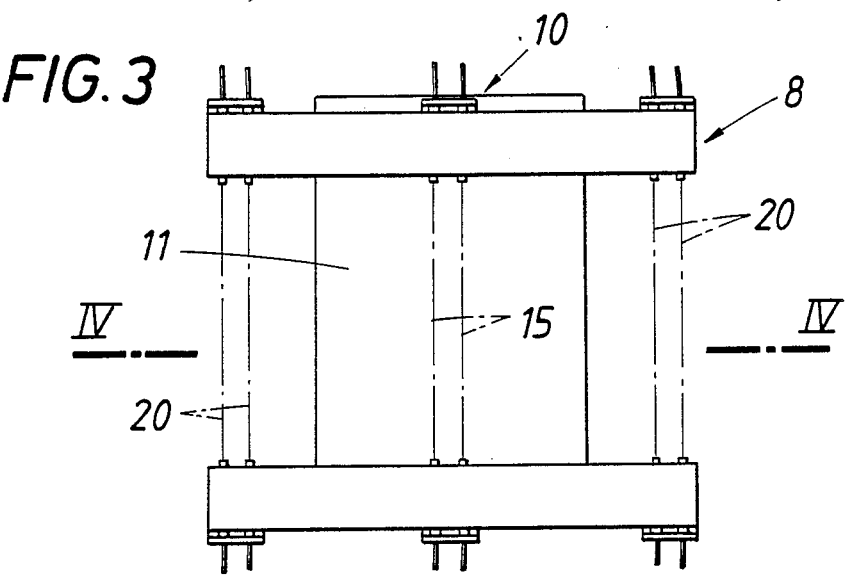
FIG. 3 is an enlarged elevation showing means for detecting the position and direction of the free longitudinal edge of an applied convolution of the non-woven strip viewed on that side of said means which faces the carrier web.
Figure 4:
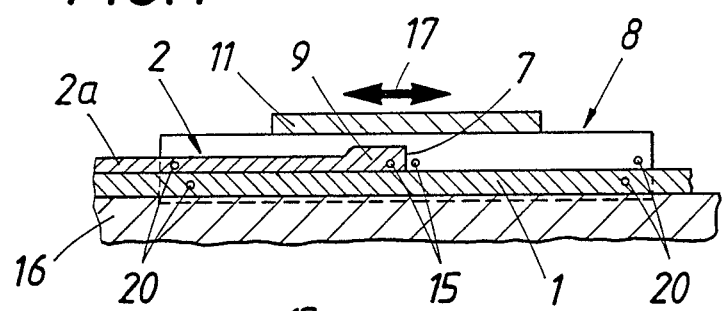
FIG. 4 is a sectional view taken on line IV—IV in FIG. 3.

It may be desired that the non-woven strip 2 fed to the carrier web 1 should exactly adjoin the free longitudinal edge 7 of that convolution 2a of the non-woven strip which has been needled to the carrier web 1 during its last preceding revolution. This is permitted in that the position and longitudinal direction of the edge 7 are detected by a means 8 for a non-contacting scanning of the longitudinal edge 7. This will not be possible unless the convolution 2a of the non-woven strip which constitutes the free longitudinal edge 7 has a sufficient thickness at least adjacent to the longitudinal edge 7 and that thickness exceeds the thickness of the non-woven strip which has previously been needled. For this reason a marginal portion 9 of the non-woven strip 2 is not needled during the initial needling of the non-woven strip 2 to the carrier web 1, as is apparent from FIG. 2. For that purpose the needling device 4 is set back from the longitudinal edge 7 by the width of the marginal portion 9 so that the thickness of the non-needled non-woven strip 2 is available for a detection of the position and longitudinal direction of the edge 7 by the scanning means 8. As a result, the drive for the carriage 5 associated with the feeder 3 may be controlled in such a manner that the portion 2b of the non-woven web which immediately succeeds the convolution 2a can be laid to exactly adjoin the edge face of the longitudinal edge 7 and said portion 2b of the non-woven strip can then be needled to the carrier web 1 together with the not yet needled marginal portion 9 of the last preceding convolution 2a whereas a new marginal portion 9 is initially left non-needled. As is apparent from FIG. 2 the fact that the working width of the needling device 4 equals the width of the non-woven strip has the result that the needling device 4 will always act also on the last preceding convolution in a marginal portion which corresponds to that marginal portion 9 in which the just applied nonwoven strip is not acted upon by the needling device. For that reason the means 8 for detecting the longitudinal edge 7 must precede the needling device 4 when viewed in the direction in which the carrier web 1 revolves.

In the illustrative embodiment shown in FIGS. 1 to 4 the means 8 consist of a scanning sensor comprising a light-emitting and light-receiving unit 10. The scanning sensor is reciprocated to move a light beam across the longitudinal edge 7. For this purpose the carrier 11 of the scanning sensor is mounted on a carriage 12, which can be reciprocated by a drive 13 along a track 14. The light-emitting and light-receiving unit 10 produces two light beams 15, which extend adjacent to a deflecting member 16 for the carrier web 1 in a direction which is tangential to said deflecting member 16 and are spaced from the carrier web 1 a distance which is smaller than the thickness of the non-needled non-woven strip, as is apparent from FIG. 4. Because the scanning sensor is reciprocated as is indicated by the double-headed arrow 17, the light beams 15 can be interrupted and released by the longitudinal edge 7 and the position of the longitudinal edge 7 can exactly be detected from the position of the emitting and receiving unit 10 at the time when a light beam is interrupted or released. In the practical control of the drive for the carriage 5 associated with the feeder 3 in dependence on the detected position of the longitudinal edge 7, the longitudinal direction of said edge is determined from the detected positions of the longitudinal edge 7 by means of a computer and any irregularity which may occur may be compensated in that the measured values are averaged.

For a reliable control of the light beams 15 it is essential that said light beams extend in the thickness range of the not yet needled marginal portion 9 and that they are so adjusted that said requirement will always be met. For this purpose the carrier 11 for the light-emitting and -receiving unit 10 is mounted on a track 18 to be movable transversely to the surface of the carrier web 1 and the associated drive 19 is controlled by the response of two photodetectors 20, which generate thickness-detecting light beams 20 which are disposed on that side of the edge-detecting light beams 15 which is opposite to the last preceding convolution 2a of the non-woven strip. The thickness-detecting light beams 20 extend in a direction which is tangential to the deflecting member 16 and are radially spaced apart with respect to the deflecting member by a distance which is smaller than the thickness of the non-needled non-woven strip. If the light-emitting and light-receiving unit 10 is so controlled by the drive 19 that one of the thickness-detecting light beams 20 is interrupted by the carrier web 1 whereas the other thickness-detecting light beam 20 remains uninterrupted, the spacing of the light beams 20 will ensure that the light beams 15 lie in the thickness range of the marginal portion 9. If the non-woven strip is fed with an opposite hand, the direction of travel of the carriage 5 must be reversed and additional means for generating thickness-detecting light beams 20 must be provided on the opposite side of the light-emitting and light-receiving unit 10 so that the distance of the edge-detecting light beams 15 from the surface of the carrier web can be controlled during a movement of the carriage 5 in both directions.

Figure 5:
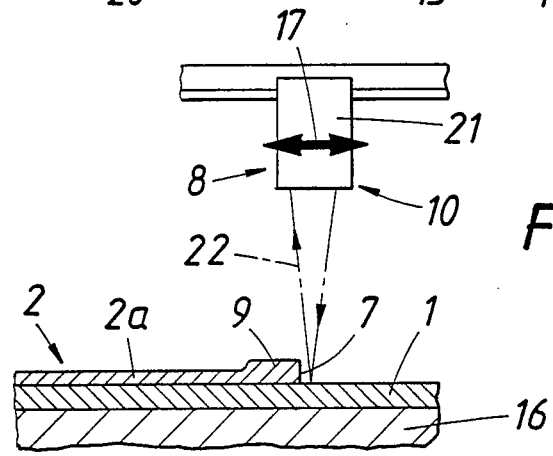
FIG. 5 is a view that is similar to FIG. 4 and illustrates different means for detecting the free longitudinal edge of a convolution of a non-woven strip which has been applied to the carrier web.

Other means which can be adopted to detect the position and direction of the edge 7 of the convolution are shown in FIG. 5. A light-emitting and light receiving unit 10 is again provided, which is reciprocated across the longitudinal edge 7. But in that case the light-emitting and light-receiving unit 10 consists of an emitting and receiving head 21 for detecting the deflection of a light beam 22 which has been reflected by the surface of the carrier web 1 or of the non-woven strip 2 which has been applied. The position which is assumed by the emitting and receiving head 21 at the time at which the light beam 22 moves across the longitudinal edge 7 will indicate the position of a point of the longitudinal edge 7 so that the position and direction of that longitudinal edge can exactly be determined by the detected positions of such points whereas it is not necessary to measure the thickness of the non-woven strip. Because the marginal portion 9 has not been needled, the deflection of the light beam will be sufficient for a reliable response of the emitting and receiving head 21.

Figure 6:
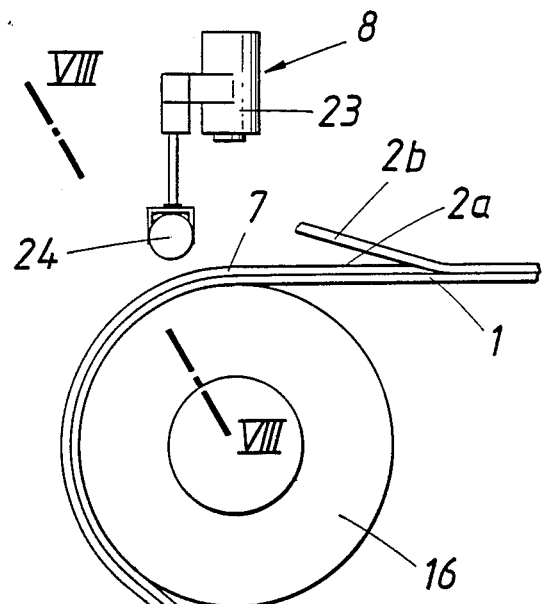
FIG. 6 is a diagrammatic side elevation showing other means for detecting the free longitudinal edge of a convolution of the non-woven strip.
Figure 7:
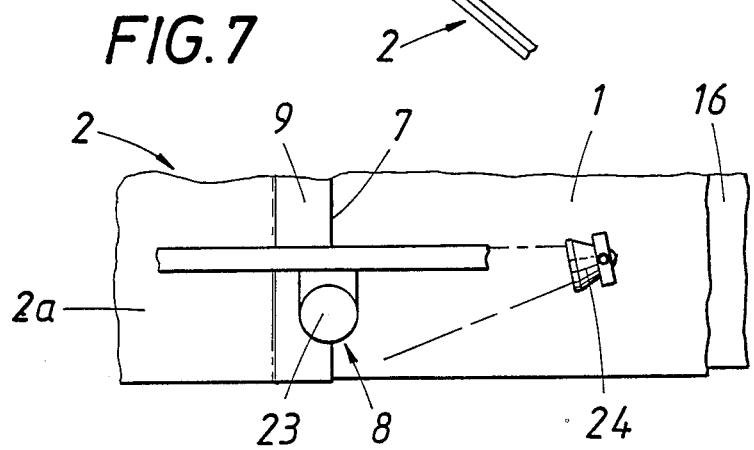
FIG. 7 is a top plan view showing the means illustrated in FIG. 6.
Figure 8:
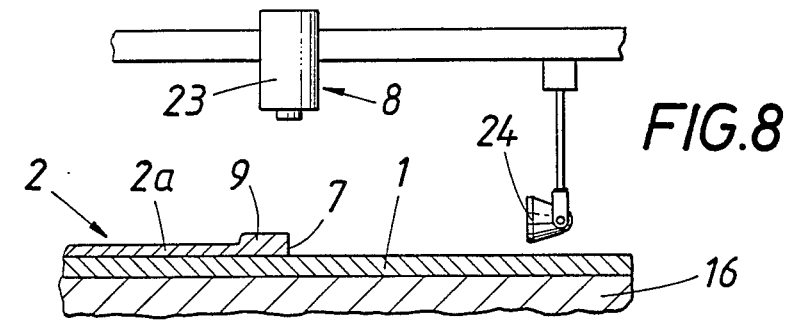
FIG. 8 is a sectional view taken on line VIII—VIII in FIG. 6.

Instead of a light-emitting and light-receiving unit, an optoelectronic monitoring device such as is shown in FIGS. 6 to 8 may be employed. That monitoring device 8 essentially consists of a line-scanning camera 23, which is directed to the longitudinal edge 7, and a light projector 24, which is directed toward the longitudinal edge 7 and causes the surface of the carrier web 1 and of the non-woven strip 2 to be illuminated with grazing light whereas the edge face of the free longitudinal edge 7 is brightly illuminated because said edge face extends substantially at right angles to the light rays. For this reason the line-scanning camera 23 sees a bright line, which extends along the longitudinal edge 7 and constitutes an adequate contrast to the adjoining regions of the carrier web 1 and of the non-woven web 2 so that said bright line can reliably be detected by the line-scanning camera 23. As a result, that scanning device will also permit the position and direction of the free longitudinal edge 7 to be monitored in a simple manner for such a control of the traversing drive for the feeder 3 in dependence on the position and direction of said edge that adjacent edges of adjacent convolutions of the non-woven strip will closely adjoin each other. It will be understood that regardless of the design of the scanning means 8 they must be moved in unison with the feeder 3. This can most simply be achieved in that the scanning means 8 are coupled to the feeder 3.

In view of the desire that adjacent edges of adjacent convolutions of the non-woven strip should exactly adjoin each other it must be borne in mind that the needling will result in a decrease of the width of the non-woven strip. That decrease in width can be taken into account in that the non-woven strip is applied to overlap the previously needled convolution of the non-woven strip. This may be applicable not only to the preliminary needling of the non-woven strip but also to any possibly succeeding main needling of the entire non-woven covering. Besides, the joint needling of the not yet needled marginal portion 9 and of the succeeding non-woven strip forming a new convolution will result in an improved joint between adjacent convolutions of the non-woven strip so that a generally more uniform non-woven covering will be obtained.

Figure 9:
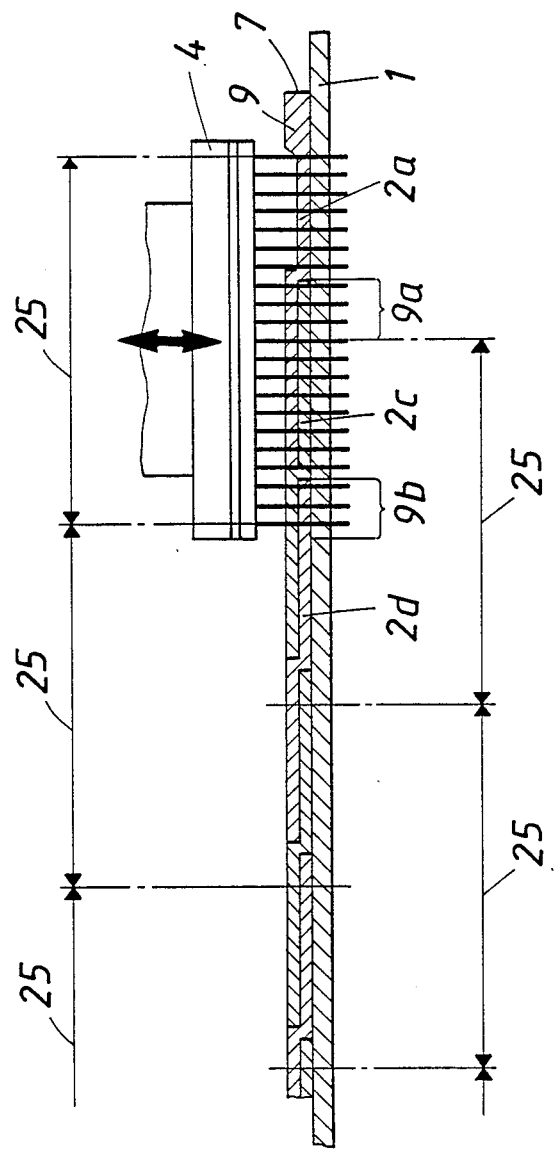
FIG. 9 is a view which is similar to FIG. 2 and illustrates the needling of overlapping convolutions of the non-woven strip to form of a plurality of layers.

The apparatus which has been described may also be used only to lay convolutions of a non-woven strip one over the other with a predetermined overlap, as is indicated in FIG. 9. In that illustrative embodiment the traversing drive for the feeder 3 is controlled to effect an overlap by one-half of the width of the non-woven strip. The position and direction of the free longitudinal edge 7 of the convolution which has been needled to the carrier web during its last preceding revolution is detected by means which are not shown in FIG. 9. Not only the marginal portion 9a of the convolution 2c which precedes the convolution 2a but also the marginal portion 9b of the convolution 2d which precedes the convolution 2c are needled to the carrier web by the needling device 4, which is set back from the longitudinal edge 7 of the convolution 2a by the width of the marginal strip 9a of the convolution 2a. In that case the marginal strip 9b will be needled for the second time so that the entire non-woven covering will be uniformly needled twice as is indicated in FIG. 9 by the needling areas 25, which overlap each other by one half of their area.

It will be understood that the invention is not restricted to the embodiments shown by way of example. For instance, the carrier web might be moved transversely to the direction in which it revolves relative to a stationary feeder because for an application of convolutions of a non-woven strip it will be sufficient to effect a relative movement of the carrier web, on the one hand, and of the feeder and the needling device, on the other hand, in a direction which is transverse to the carrier web.

We claim:

1. In a process of needling a non-woven strip to an endless carrier web, comprising
    continuously revolving said endless carrier web in its longitudinal direction on conveyer means,
    feeding said non-woven strip to said revolving carrier web at a predetermined lead angle to said longitudinal direction,
    applying said non-woven strip to said revolving carrier web,
    imparting to said non-woven strip as it is fed and applied to said carrier web a traversing movement relative to said carrier web in a direction which is transverse to said longitudinal direction, whereby said non-woven strip is caused to form on said carrier web a plurality of consecutive convolutions, which extend generally at said lead angle to said longitudinal direction,
    detecting the position and longitudinal direction preceding one of said convolutions before said non-woven strip is applied to said carrier web to form the next succeeding one of said convolutions,
    controlling said traversing movement of said non-woven strip relative to said carrier web in dependence on the thus detected position and longitudinal direction of the last preceding one of said convolutions so that said non-woven strip for forming said next succeeding convolution is applied to said carrier web in contact with said last preceding convolution, and
    continuously needling said non-woven strip to said carrier web,
    the improvement comprising that
    said non-woven strip of each of said convolutions is initially needled to said carrier web only in a width portion which trails in the direction of said traversing movement whereas said non-woven strip is initially left non-needled in a marginal portion thereof which leads in the direction of said traversing movement and has a free longitudinal edge facing in the direction of said traversing movement,
    the position and direction of said free longitudinal edge are detected before said non-woven strip for forming the next succeeding one of said convolutions is applied to said carrier web, and
    said initially non-needled marginal portion of each of said convolutions is needled to said carrier web on said conveyor means when at least part of said non-woven strip for the next succeeding one of said convolutions has been applied to said carrier web on said conveyor means.

2. The improvement set forth in claim 1 as applied to a process of covering said endless web with at least two plies of said non-woven strip needled to said carrier web.

3. The improvement set forth in claim 1, wherein
    said traversing movement of said non-woven strip relative to said carrier web is so controlled that said non-woven strip applied to form the next succeeding one of said convolutions laterally adjoins the last preceding one of said convolutions.

4. The improvement set forth in claim 1, wherein
    said traversing movement of said non-woven strip relative to said carrier web is so controlled that said non-woven strip applied to form the next succeeding one of said convolutions overlaps the last preceding one of said convolutions to a predetermined extent.

5. The improvement set forth in claim 1, wherein said initially non-needled portion of each preceding one of said convolutions is needled to said carrier web at the same time as said trailing width portion of the next succeeding one of said convolutions.

6. In an apparatus for needling a non-woven strip to an endless carrier web, comprising conveyor means for continuously revolving an endless carrier web in its longitudinal direction, a feeder for feeding a non-woven strip to said conveyor means at a predetermined lead angle to said longitudinal direction and for applying said non-woven strip to said carrier web as it is revolved by said conveyor means, traversing means for imparting to said feeder a traversing movement relative to said conveyor means in a direction which is transverse to said longitudinal direction, whereby said non-woven strip is caused to form on said carrier web a plurality of consecutive convolutions, which extend at said lead angle to said longitudinal direction, detecting means for detecting the position and longitudinal direction of each preceding one of said convolutions as said non-woven strip is applied to said carrier web to form the next succeding one of said convolutions, control means for controlling said traversing movement of said feeder in dependence on the thus detected position and longitudinal direction of the last preceding one of said convolutions, and needling means which are coupled to said traversing means for performing said traversing movement in unison with said feeder and which are operable to needle said non-woven strip to said carrier web on said conveyor means, the improvement comprising that said needling means are operable to needle said non-woven strip of each of said convolutions to said carrier web on said conveyor means only in a width portion which trails in the direction of said traversing movement so that said non-woven strip is initially left non-needled in a marginal portion thereof which leads in the direction of said traversing movement and has a free longitudinal edge facing in the direction of said traversing movement, said detecting means are operable to detect the position and direction of said free longitudinal edge, said control means are operable to control said traversing movement in dependence on the thus detected position and direction of said free longitudinal edge, and said needling means are operable to needle said initially non-needled marginal portion of each of said convolutions to said carrier web on said conveyor means when at least part of said non-woven strip for forming the next succeeding one of said convolutions has been applied to said carrier web on said conveyor means.

7. The improvement set forth in claim 6, wherein said needling means are operable to needle said initially non-needled marginal portion of each prededing one of said convolutions to said carrier web on said conveyor means at the same time as said trailing width portion of the next succeeding one of said convolutions.

8. The improvement set forth in claim 6 as applied to an apparatus in which said conveyor means comprise a deflecting member for deflecting said revolving endless carrier web, wherein said detecting means are operable to detect the position and direction of said free longitudinal edge adjacent to said deflecting member.

9. The improvement set forth in claim 6 as applied to an apparatus for needling a non-woven strip having a predetermined width to said carrier web, wherein said needling means having a working width which is equal to said predetermined width and which, opposite to the direction of said traversing movement is offset from said feeder to an extent which determines the width of said initially non-needled marginal portion.

10. The improvement set forth in claim 7, wherein said needling means are spaced from said detecting means in said longitudinal direction, said conveyor means are operable to revolve said endless carrier web to move from said detecting means to said needling, and said feeder is operable to apply said non-woven strip to said carrier web on a line which in said longitudinal direction is disposed between said detecting means and said needling means.

11. The improvement set forth in claim 7, wherein said feeder is operable so to apply said non-woven strip to said carrier web on said conveyor means that said free longitudinal edge extends at any given time in a predetermined width portion of said carrier web, and said detecting means comprise a scanning detector having a light-emitting and light-receiving unit for generating an edge-detecting light beam which extends transversely to said free longitudinal edge adjacent to said width portion of said carrier web and for receiving said edge-detecting light beam and means for reciprocating said unit so that said edge-detecting light beam is reciprocated across said width portion.

12. The improvement set forth in claim 11, as applied to an apparatus for needling a non-woven strip having in a non-needled state a predetermined thickness to said carrier web, wherein said conveyor means comprise a deflecting member for deflecting said carrier web adjacent to said detecting means, said unit is operable to generate said edge-detecting light beam so that said edge-detecting light beam extends adjacent to said deflecting member in a direction which is tangential to said deflecting member and said beam is spaced from said carrier web by a distance which is less than said predetermined thickness and is adapted to be interrupted by said free longitudinal edge and said control means are responsive to the interruption of said light beam by said free longitudinal edge.

13. The improvement set forth in claim 12, wherein said detecting means comprise adjusting means for detecting the thickness of said carrier web and for adjusting the distance of said edge-detecting light beam from said deflecting member in dependence on the thickness of said carrier web.

14. The improvement set forth in claim 13, wherein said adjusting means comprise two photodetectors for generating two thickness-detecting light beams, which extent adjacent to said deflecting member in a direction which is tangential to said deflecting member and are radially spaced apart with respect to said deflecting member by a distance which is less than said predetermined thickness.

15. The improvement set forth in claim 11, wherein said scanning detector comprises at least one light receiver for receiving said edge-detecting light beam when it has been reflected by the surface of said carrier web and said non-woven strip applied to said carrier web and for detecting the deflection of said reflected edge-detecting light beam.

16. The improvement set forth in claim 7, wherein said detecting means comprise a line-scanning camera and illuminating means for differentially illuminating said free longitudinal edge, on the one hand, and said carrier web and of said non-woven strip applied to said carrier web.

17. The improvement set forth in claim 16, wherein said illuminating means comprise a light projector for directing light to said free longitudinal edge in a direction which is substantially parallel to the surface of said carrier web and transverse to said free longitudinal edge.

* * * * *